H. BEITZELL.
Seed-Drill Teeth.

No. 18,317. Patented Oct. 6, 1857.

UNITED STATES PATENT OFFICE.

HENRY BEITZELL, OF CENTREVILLE, INDIANA.

IMPROVEMENT IN GRAIN-DRILLS.

Specification forming part of Letters Patent No. 18,317, dated October 6, 1857.

*To all whom it may concern:*

Be it known that I, HENRY BEITZELL, of Centreville, in the county of Wayne and State of Indiana, have invented certain new and useful Improvements in Machines for the Planting and Drilling of Grain and Cultivating the Soil; and I do hereby declare that the following is a full, clear, and exact description of my said invention, reference being had to the accompanying drawings, and to the letters of reference marked thereon, and in which—

Figure 1:
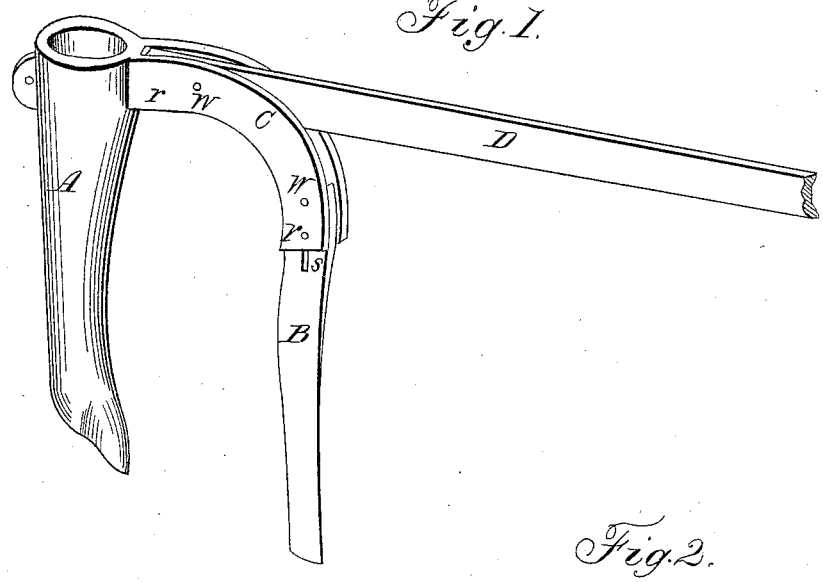
Figure 2:

Figure 1 represents a view in perspective of my entire improvement, consisting of my improved grain-drill tooth and adjustable steel (or iron) cutter in combination with the tooth and draft bar. Fig. 2 represents the adjustable cutter with the longitudinal opening hereinafter mentioned.

A, Fig. 1, is a hollow cast-iron tooth of the shape and dimensions usual in grain-drills, with the addition of two shoulders or jaws of the form and structure represented by the letter C in the drawings, which said jaws project in front of the tooth and contain holes to receive the bolts $r\ r$ and $w\ w$, and which said jaws are cast to and along with the tooth A.

D is a wrought-iron drag-bar, which is secured between the jaws of the tooth by the iron bolt $r$, and also by a wooden pin at $w$, both of which pass through the jaws and the bar. The forward end of the drag-bar is attached to the carriage-frame of the drilling-machine.

B, Fig. 2, is an adjustable cutter, made of steel or iron, which is attached to and between the jaws of the tooth A C by means of an iron pin or bolt, $r$, Fig. 1, and also a wooden pin, $w$, Fig. 1. At the upper end of the cutter is a hole, through which the wooden pin $w$ passes, and below is the longitudinal opening S, through and in which passes the iron pin $r$ in such a manner as to allow the cutter to be raised or depressed a distance equal to the length of the opening S.

When the machine is in operation the point of the cutter B penetrates the soil at a greater depth than does the tooth A, and thus it removes all obstructions in the way of the tooth A and prevents any rubbish, weeds, or other substances from accumulating under and around the point of the tooth, thereby causing the grain to be regularly and freely discharged through the tooth into the furrow immediately in the rear of the point of the tooth.

In case the cutter B should come in contact with any hard substance which cannot be resisted by the wooden pin $w$ in the cutter B the cutter will be immediately raised at S and turned backward on its pivot—the iron pin $r$—sufficiently to allow the cutter to pass without injury or without raising the tooth A out of the ground, thus causing the grain to be regularly covered by the operation of the tooth in the ground.

What I claim as my invention, and desire to secure by Letters Patent, is—

The combination of the adjustable cutter B with the drill-tooth A C and the draft-bar D, in manner and form as described and represented in said specification and drawings.

HENRY BEITZELL.

Attest:
BENJN. L. MARTIN,
B. F. BEITZELL.